United States Patent
Bashir et al.

(10) Patent No.: US 12,309,640 B2
(45) Date of Patent: *May 20, 2025

(54) PREDICTIVE USER PLANE FUNCTION (UPF) LOAD BALANCING BASED ON NETWORK DATA ANALYTICS

(71) Applicant: DISH Wireless L.L.C., Englewood, CO (US)

(72) Inventors: Kazi Bashir, Lewisville, TX (US); Mehdi Alasti, Reston, VA (US); Siddhartha Chenumolu, Broadlands, VA (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/443,872

(22) Filed: Feb. 16, 2024

(65) Prior Publication Data
US 2024/0196273 A1 Jun. 13, 2024

Related U.S. Application Data

(63) Continuation of application No. 17/529,128, filed on Nov. 17, 2021, now Pat. No. 11,950,138.

(51) Int. Cl.
*H04W 28/02* (2009.01)
*H04W 28/08* (2023.01)
*H04W 28/082* (2023.01)

(52) U.S. Cl.
CPC ..... *H04W 28/0942* (2020.05); *H04W 28/082* (2023.05)

(58) Field of Classification Search
CPC ........... H04W 28/0942; H04W 28/082; H04W 24/08; H04W 4/02; H04W 28/088;
(Continued)

(56) References Cited

U.S. PATENT DOCUMENTS

| 7,039,033 B2 | 5/2006 | Haller et al. |
| 7,864,043 B2 | 1/2011 | Camp et al. |

(Continued)

FOREIGN PATENT DOCUMENTS

| CN | 110662260 A | 1/2020 |
| CN | 112567799 A | 3/2021 |

(Continued)

OTHER PUBLICATIONS

"3rd Generation Partnership Project; Technical Specification Group Services and System Aspects; System architecture for 5G System (5GS); Stage 2 (Release 16)", vol. SA WG2, No. V16.9.0, Jun. 24, 2021, pp. 1-452.

(Continued)

*Primary Examiner* — Ahmed Elallam
(74) *Attorney, Agent, or Firm* — Kipman T. Werking; Frontier IP Law PLLC (57) ABSTRACT

Embodiments are directed towards systems and methods for selecting, in a Fifth Generation (5G) cellular telecommunication network, a User Plane Function (UPF) of a plurality of UPFs on which to anchor a Protocol Data Unit (PDU) session of a new user equipment (UE) newly appearing on the cellular telecommunication network. The selection is based on: a location of the new UE; a plurality of current loads for each UPF of the plurality of UPFs; a predicted UE load of the new UE based on network data analytics; and predicted UPF loads of the plurality of UPFs as a function of time considering the predicted UE load based on network data analytics from the Network Data Analytics Function. In the UPF selection, the Session Management Function (SMF) gives higher priority to shorter term predicted loads than longer term predicted loads.

16 Claims, 6 Drawing Sheets

(58) Field of Classification Search
CPC .. H04W 76/12; H04L 43/0876; H04L 41/147; H04L 47/125; H04L 67/1008; H04L 67/1021; H04L 67/1029; G06F 8/60
See application file for complete search history.

(56) References Cited

U.S. PATENT DOCUMENTS

| | | |
|---|---|---|
| 8,015,306 B2 | 9/2011 | Bowman |
| 8,131,212 B2 | 3/2012 | Laufer |
| 8,131,272 B2 | 3/2012 | Paalasmaa et al. |
| 9,866,789 B2 | 1/2018 | Greene |
| 10,470,152 B2 | 11/2019 | Lee et al. |
| 10,568,061 B1 | 2/2020 | Park et al. |
| 10,602,415 B2 | 3/2020 | Bae et al. |
| 10,708,824 B2 | 7/2020 | Lee et al. |
| 10,742,925 B2 | 8/2020 | Greene |
| 10,750,371 B2 | 8/2020 | Bogineni et al. |
| 10,841,838 B2 | 11/2020 | Zhang et al. |
| 11,012,328 B2 * | 5/2021 | Taft .................. H04L 43/04 |
| 11,051,192 B2 | 6/2021 | Li et al. |
| 11,096,046 B2 | 8/2021 | Dao et al. |
| 11,343,698 B2 | 5/2022 | Jeong et al. |
| 11,356,419 B1 | 6/2022 | Nosalis et al. |
| 11,412,412 B2 | 8/2022 | Narath et al. |
| 11,477,694 B1 | 10/2022 | Alasti et al. |
| 11,483,738 B1 | 10/2022 | Alasti et al. |
| 11,509,858 B2 | 11/2022 | Greene |
| 11,516,090 B2 | 11/2022 | Rtenblad et al. |
| 11,563,713 B2 | 1/2023 | Feng |
| 11,582,641 B1 | 2/2023 | Bashir et al. |
| 11,595,851 B1 | 2/2023 | Alasti et al. |
| 11,601,367 B2 | 3/2023 | Booker et al. |
| 11,627,492 B2 | 4/2023 | Alasti et al. |
| 11,647,393 B2 * | 5/2023 | Lee .................. H04W 16/10 370/329 |
| 11,678,228 B2 | 6/2023 | Srivastava et al. |
| 11,758,436 B2 | 9/2023 | Ramanoudjam et al. |
| 11,800,394 B2 | 10/2023 | Han et al. |
| 11,871,263 B2 * | 1/2024 | Osman .................. H04L 47/76 |
| 11,895,536 B2 | 2/2024 | Alasti et al. |
| 11,902,831 B2 | 2/2024 | Alasti et al. |
| 11,910,237 B2 | 2/2024 | Alasti et al. |
| 11,924,687 B2 | 3/2024 | Alasti et al. |
| 11,943,660 B2 * | 3/2024 | Alasti .................. H04W 48/18 |
| 11,950,138 B2 * | 4/2024 | Bashir .................. H04L 47/125 |
| 12,052,657 B2 | 7/2024 | Garcia Martin |
| 12,095,640 B2 | 9/2024 | Fan et al. |
| 2002/0180887 A1 | 12/2002 | Kim et al. |
| 2004/0021794 A1 | 2/2004 | Nakayama et al. |
| 2005/0157171 A1 | 7/2005 | Bowser |
| 2005/0266798 A1 | 12/2005 | Moloney et al. |
| 2006/0003802 A1 | 1/2006 | Sinai |
| 2006/0146190 A1 | 7/2006 | Ahn et al. |
| 2006/0234631 A1 | 10/2006 | Dieguez |
| 2006/0274194 A1 | 12/2006 | Ouyang et al. |
| 2008/0007651 A1 | 1/2008 | Bennett |
| 2008/0055314 A1 | 3/2008 | Ziemski |
| 2008/0147798 A1 | 6/2008 | Paalasmaa et al. |
| 2009/0112980 A1 | 4/2009 | Fujimoto |
| 2009/0177996 A1 | 7/2009 | Hunt et al. |
| 2009/0238170 A1 | 9/2009 | Rajan et al. |
| 2009/0251594 A1 | 10/2009 | Hua et al. |
| 2009/0325595 A1 | 12/2009 | Farris |
| 2010/0031139 A1 | 2/2010 | Ihara |
| 2010/0134633 A1 | 6/2010 | Engeli et al. |
| 2010/0167646 A1 | 7/2010 | Alameh et al. |
| 2010/0194753 A1 | 8/2010 | Robotham et al. |
| 2011/0028129 A1 | 2/2011 | Hutchison et al. |
| 2011/0304583 A1 | 12/2011 | Kruglick |
| 2012/0170561 A1 | 7/2012 | Tsai et al. |
| 2012/0190299 A1 | 7/2012 | Takatsuka et al. |
| 2012/0290653 A1 | 11/2012 | Sharkey |
| 2012/0317194 A1 | 12/2012 | Tian |
| 2013/0090064 A1 | 4/2013 | Herron et al. |
| 2013/0147845 A1 | 6/2013 | Johnson et al. |
| 2015/0128030 A1 | 5/2015 | Tyagi |
| 2016/0203585 A1 | 7/2016 | Welinder et al. |
| 2016/0231978 A1 | 8/2016 | Hawver et al. |
| 2016/0234522 A1 | 8/2016 | Lu et al. |
| 2016/0316243 A1 | 10/2016 | Park et al. |
| 2017/0099159 A1 | 4/2017 | Abraham |
| 2018/0262924 A1 | 9/2018 | Dao et al. |
| 2018/0324646 A1 | 11/2018 | Lee et al. |
| 2019/0053117 A1 | 2/2019 | Bae et al. |
| 2019/0075431 A1 | 3/2019 | Albasheir et al. |
| 2019/0191330 A1 | 6/2019 | Dao et al. |
| 2020/0068587 A1 | 2/2020 | Garcia Azorero et al. |
| 2021/0045091 A1 | 2/2021 | Arora et al. |
| 2021/0051531 A1 | 2/2021 | Alasti et al. |
| 2021/0105652 A1 | 4/2021 | Jeong et al. |
| 2021/0219179 A1 | 7/2021 | Narath et al. |
| 2021/0288886 A1 | 9/2021 | Örtenblad et al. |
| 2021/0314842 A1 | 10/2021 | Padlikar et al. |
| 2021/0329485 A1 | 10/2021 | Han et al. |
| 2021/0337553 A1 * | 10/2021 | Chong .................. H04L 41/5067 |
| 2021/0377807 A1 | 12/2021 | Lee |
| 2021/0385625 A1 | 12/2021 | Qiao et al. |
| 2022/0039177 A1 | 2/2022 | Talebi Fard et al. |
| 2022/0078857 A1 | 3/2022 | Kim |
| 2022/0159605 A1 | 5/2022 | Li et al. |
| 2022/0167211 A1 | 5/2022 | Sharma et al. |
| 2022/0210658 A1 | 6/2022 | Lee |
| 2022/0247688 A1 | 8/2022 | Puente Pestaña et al. |
| 2022/0264258 A1 | 8/2022 | Zong et al. |
| 2022/0337480 A1 | 10/2022 | Vanajakshi et al. |
| 2022/0345929 A1 | 10/2022 | Lee et al. |
| 2022/0368675 A1 | 11/2022 | Narula et al. |
| 2022/0369170 A1 | 11/2022 | Roeland et al. |
| 2022/0369204 A1 | 11/2022 | Jeong et al. |
| 2023/0067535 A1 | 3/2023 | Alasti et al. |
| 2023/0156522 A1 | 5/2023 | Bashir et al. |
| 2023/0180038 A1 | 6/2023 | Chen et al. |
| 2023/0239227 A1 | 7/2023 | Espinosa Santos et al. |
| 2023/0275832 A1 | 8/2023 | Lam |
| 2023/0308951 A1 * | 9/2023 | Zhang .................. H04W 28/084 |
| 2024/0049060 A1 | 2/2024 | Narasimham et al. |
| 2024/0196275 A1 * | 6/2024 | Alasti .................. H04W 28/0942 |

FOREIGN PATENT DOCUMENTS

| | | | | |
|---|---|---|---|---|
| CN | 112867050 A | | 5/2021 | |
| CN | 113475123 A | | 10/2021 | |
| CN | 114916012 A | | 8/2022 | |
| CN | 114025367 B | * | 11/2022 | |
| CN | 115696454 A | * | 2/2023 | .............. H04L 12/12 |
| EP | 3955523 A1 | | 2/2022 | |
| KR | 10-2106778 B1 | | 5/2020 | |
| WO | 2019/160546 A1 | | 8/2019 | |
| WO | 2020/032769 A1 | | 2/2020 | |
| WO | 2021/063515 A1 | | 4/2021 | |
| WO | 2021/091225 A1 | | 5/2021 | |
| WO | 2021/111213 A1 | | 6/2021 | |
| WO | 2021/155940 A1 | | 8/2021 | |
| WO | 2021/261074 A1 | | 12/2021 | |
| WO | 2022/033896 A1 | | 2/2022 | |
| WO | 2022/053134 A1 | | 3/2022 | |
| WO | 2022/098696 A1 | | 5/2022 | |
| WO | 2022/157667 A1 | | 7/2022 | |
| WO | 2022/192523 A | | 9/2022 | |

OTHER PUBLICATIONS

Bashir, Kazi, et al., "Predictive User Plane Function (UPF) Load Balancing Based On Network Data Analytics", U.S. Appl. No. 17/529,128, Nov. 17, 2021, 32 pages.

Ding Xiaohan et al: "Repvgg: Making vgg-style convnets great again." Proceedings of the IEEE/CVF conference on computer vision and pattern recognition. 2021, pp. 13728-13737.

He Kaiming et al: "Deep residual learning for image recognition." Proceedings of the IEEE conference on computer vision and pattern recognition. 2016, pp. 770-778.

Liu Guangzhe et al: "ASKs: Convolution with any-shape kernels for (56) References Cited

OTHER PUBLICATIONS efficient neural networks." Neurocomputing vol. 446 (2021), pp. 32-49.
International Search Report and Written Opinion received for PCT Patent Application No. PCT/US22/040157, mailed on Nov. 21, 2022, 13 pages.
International Search Report and Written Opinion received for PCT Patent Application No. PCT/US22/041334, mailed on Nov. 30, 2022, 14 pages.
International Search Report and Written Opinion received for PCT Patent Application No. PCT/US22/041343, mailed on Dec. 5, 2022, 14 pages.
International Search Report and Written Opinion received for PCT Patent Application No. PCT/US2022/049596, mailed on Mar. 3, 2023, 10 pages.
Samsung, et al., "Key Issue 6 Solution Evaluation and Conclusion", 3GPP Draft, S2-1812183_Key Issue 6 Solution Evaluation and Conclusion, 3rd Generation Partnership Project (3GPP), vol. SA WG2, XP051498907, http://www.3gpp.org/ftp/tsg%5Fsa/WG2%5FArch/TSGS2%5F129BIS%5FWest%5FPalm%5FBeach/Docs/S2%201812183%2Ezip, Nov. 20, 2018, 10 pages.
Alasti et al., "User Plane Function (UPF) Load Balancing Based on Network Data Analytics to Predict Load of User Equipment," U.S. Appl. No. 17/458,117, filed Aug. 26, 2021 (62 pages).
Alasti et al., "User Plane Function (UPF) Load Balancing Based on Current UPF Load and Thresholds That Depend on UPF Capacity." U.S. Appl. No. 17/400,943, filed Aug. 12, 2021. (65 pages).
Alasti et al., "User Plane Function (UPF) Load Balancing Based on Special Considerations for Low Latency Traffic," U.S. Appl. No. 17/458,120, filed Aug. 26, 2021. (62 pages).
Alasti et al., "User Plane Function (UPF) Load Balancing Supporting Multiple Slices," U.S. Appl. No. 17/458,889, filed Aug. 27, 2021. (67 pages).
Alasti et al., "User Plane Function (UPF) Load Balancing Based on Central Processing Unit (CPU) and Memory Utilization of the User Equipment (UE) in the UPF," U.S. Appl. No. 17/459,279, filed Aug. 27, 2021. (63 pages).
3GPP TS 29.520 V17.4.0, "3rd Generation Partnership Project; Technical Specification Group Core Network and Terminals; 5G System; Network Data Analytics Services; Stage 3; (Release 17)," 3GPP Organizational Partners, 133 pages, Sep. 2021.
Marappan, "NWDAF: Automating the 5G network with machine learning and data analytics", Jun. 2020, 7 pages.

\* cited by examiner

FIG. 6

PREDICTIVE USER PLANE FUNCTION (UPF) LOAD BALANCING BASED ON NETWORK DATA ANALYTICS

TECHNICAL FIELD

The present disclosure relates generally to digital message communications and, more particularly, to User Plane Function (UPF) load balancing within a Fifth Generation (5G) communications network.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of 5G technology has resulted in faster speeds and increased bandwidth, but with the drawback of potentially overloading certain portions of the network in certain circumstances. It is with respect to these and other considerations that the embodiments described herein have been made.

5G Core (5GC) is the heart of a 5G mobile network. It establishes reliable, secure connectivity to the network for end users and provides access to its services. The core domain handles a wide variety of essential functions in the mobile network, such as connectivity of new user equipment (UE) and mobility management, authentication and authorization, subscriber data management and policy management, among others. 5G Core network functions are completely software-based and designed as cloud-native, meaning that they're agnostic to the underlying cloud infrastructure, allowing higher deployment agility and flexibility.

With the advent of 5G, industry experts defined how the core network should evolve to support the needs of 5G New Radio (NR) and the advanced use cases enabled by it. The 3rd Generation Partnership Project (3GPP) develops protocols for mobile telecommunications and has developed a standard for core networks known as 5G Core (5GC).

The 5GC architecture is based on what is called a Service-Based Architecture (SBA), which implements IT network principles and a cloud-native design approach. In this architecture, each network function (NF) offers one or more services to other NFs via Application Programming Interfaces (API). Each NF, such as the UPF, the Network Data Analytics Function (NWDAF) and the Session Management Function (SMF) is formed by a combination of small pieces of software code called as microservices.

Briefly described, embodiments are directed toward systems and methods for predictive UPF load balancing within a 5G network. Example embodiments include systems and methods for determining a plurality of current loads for each UPF of a plurality of UPFs in a cellular telecommunication network. The plurality of UPFs serve as anchor points between UE in the cellular telecommunication network and an associated data network (DN). Each UPF of the plurality of UPFs is a virtual network function responsible for interconnecting Protocol Data Unit (PDU) sessions between the user UE and the DN by anchoring the PDU sessions on individual UPFs. The system receives a request to anchor on a UPF a PDU session of a new UE newly appearing on the cellular telecommunication network and selects a UPF of the plurality of UPFs on which to anchor the PDU session based on: a location of the new UE; the plurality of current loads for each UPF of the plurality of UPFs; a predicted UE load of the new UE based on network data analytics; and predicted UPF loads of the plurality of UPFs as a function of time considering the predicted UE load based on network data analytics. For example, the system may be configured to determine the plurality of current loads for each UPF of the plurality of UPFs; the predicted UE load of the new UE based on network data analytics; and the predicted UPF loads of the plurality of UPFs as a function of time considering the predicted UE load based on network data analytics captured or tracked by the NWDAF.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
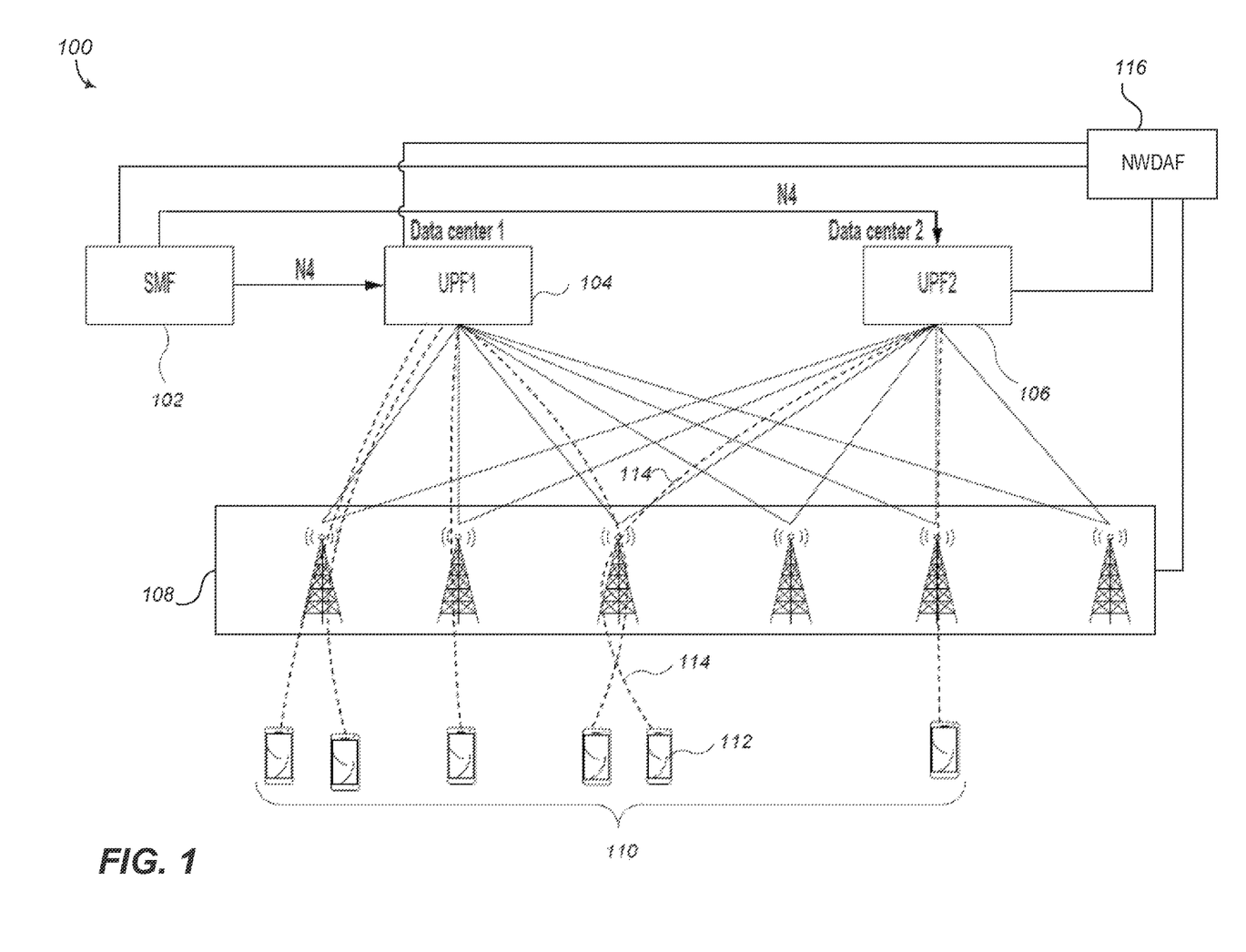
FIG. 1 illustrates a context diagram of an environment in which predictive UPF load balancing may be implemented in accordance with embodiments described herein.

FIG. 1 illustrates a context diagram of an environment in which predictive UPF load balancing may be implemented in accordance with embodiments described herein.

UEs 110, such as cellular telephones or other Internet-of-Tings (IoT) devices use 5G wireless cellular telecommunication technology defined by standards set by 3GPP and International Telecommunications Union (ITU) to get data connectivity between applications on the UE and DNs such as the Internet or private corporate networks. Almost all applications running on the UE, including voice, require such data connectivity. A Protocol Data Unit (PDU) session provides connectivity between applications on a UE and a DN. The UE receives services through a PDU session, which is a logical connection between the UE and DN. A DN is identified by a Data Network Name (DNN). PDU sessions can provide different types of transport services corresponding to the nature of the PDU(s) carried over the PDU session. In various embodiments, a PDU session may be associated with a single DNN and with a single slice identified by Single-Network Slice Selection Assistance Information (S-NSSAI).

The UPF is one of the network functions (NFs) of the 5GC. The UPF, comprising UPF1 104 and UPF2 106 in the present example, is responsible for packet routing and forwarding, packet inspection, quality of service (QOS) handling, and interconnecting external PDU sessions with the DN. Although two UPFs (UPF1 104 and UPF2 106) are shown in the present example, additional UPFs may be utilized in various other embodiments. Each UPF (e.g., UPF1 104 and UPF2 106) is a virtual network function responsible for PDU sessions between the UEs 110 and the DN by anchoring the PDU sessions of various UEs 110 on the individual UPF. The SMF 102 is also one of the NFs of the 5GC and is primarily responsible for interacting with the decoupled data plane, creating updating and removing PDU sessions, selecting particular UPFs on which to anchor PDU sessions when new UEs appear on the network and managing session context with the UPF. Many of such functions are described in the 3GPP TS 23.501 specification.

Network data analytics is provided via the NWDAF 116 defined as part of the 5GC architecture by 3GPP in 3GPP TS 29.520, and is in operable communication with each UPF (e.g., UPF1 104 and UPF2 106), the SMF 102, and may receive relevant data based on information originating from the various cellular telecommunication base stations 108.

NWDAF 116 incorporates interfaces from the service-based architecture to collect data by subscription or request model from other 5G network functions and procedures. The NWDAF 116 may collect data from UEs 110, network functions, and operations, administration, and maintenance (OAM) systems, etc. from the 5GC, cloud, and edge networks that can be used for analytics. In an example embodiment, the current and predicted UE load of each of the UEs 110, the current and predicted UPF load of each UPF (e.g., UPF1 104 and UPF2 106) and predicted UPF loads of each UPF considering the predicted additional UE load of any of the UEs 110 on a particular UPF may be based on data from, or as configured herein, determined by, the NWDAF 116. The predicted load may be measured in units based on throughput (e.g., packets per second, bytes per second, and/or bits per second), the amount of bytes downloaded or uploaded by the UE, CPU utilization (e.g., CPU clock cycles, clock ticks, CPU time, CPU time per second, process time, percentage of CPU capacity utilization) and/or memory utilization, (megabytes of memory, and/or percentage of memory capacity utilization) or any combination thereof.

A network function, such as the NWDAF 116, the SMF 102 and the UPF, (e.g., UPF1 104 and UPF2 106), and can be implemented either as a network elements on dedicated hardware, as a software instance running on dedicated hardware, or as a virtualized function instantiated on an appropriate platform, e.g., a cloud infrastructure. In the present example, UPF1 104 is implemented at data center 1 and UPF2 106 is implemented at data center 2, which is geographically separated from data center 1. The SMF 102 sends messages to the UPF (comprising UPF 1 104 and UPF 2 in the present example) over the N4 reference interface using the Packet Forwarding Control Protocol (PFCP). The PFCP may employ UDP port (8805) and is defined to support Control and User Plane Separation (CUPS). Decoupling other control plane functions from the user plane, together with the 5G Core Access and Mobility Management Function (AMF) (not shown), the standard allows the SMF 102 or UPF to perform the role of Dynamic Host Control Protocol (DHCP) server and Internet Protocol (IP) Address Management (IPAM) system. Together with the UPF, the SMF 102 maintains a record of PDU session state by means of a 24 bit PDU Session ID. The SMF 102 sets configuration parameters in the UPF that define traffic steering parameters and ensure the appropriate routing of packets while guaranteeing the delivery of incoming packets, though a Downlink (DL) data notification.

In an example embodiment, each UPF1 104 and UPF2 106 may have the ability to establish network connectivity and anchor PDU sessions of any UE on the network via various cellular telecommunication base stations and associated antennas 108. To maximize network performance, PDU sessions are by default anchored on the UPF at the data center that is closest geographically to the UE, as illustrated by most of the dashed lines in FIG. 1 for UEs 110 (and an operator defines a service area for each UPF). However, each UPF (e.g., UPF1 104 and UPF2 106) has a maximum network capacity to handle PDU sessions anchored thereon and the associated network traffic. Thus, PDU sessions anchored on a particular UPF (e.g., UPF1 104) and their associated network traffic may cause UPF1 104 to become too overloaded compared to other UPFs (eg., UPF2 106) if the PDU session of a new UE is anchored on it along with all the other UEs currently anchored on it. Predictive UPF load balancing may then cause the PDU session of the next new UE appearing on the network (e.g., UE 112) to be anchored on a UPF at a data center (e.g., UPF2 106) that is farther away than the data center that is closest geographically to the UE.

In the present example, predictive UPF load balancing based on network data analytics may indicate UPF1 104 will be too overloaded compared to UPF2 106 if the PDU session of UE 112 is anchored on it along with all the other UEs currently anchored on it, so UE 112 has a PDU session anchored on UPF2 106 (as shown by dashed line 114) instead of UPF1 104, even though data center 2 of UPF2 106 is farther away from the UE 112 than data center 1 of UPF1 104. In various embodiments described herein, there may be different particular scenarios and rules in which predictive UPF load balancing may cause the PDU session of the next new UE appearing on the network to be anchored on a UPF at a data center that is farther away than the data center that is closest geographically to the UE, which ultimately improves overall predictive UPF load balancing and network performance. For example, selection of a UPF on which to anchor the PDU may be such that larger weight is put on consideration of shorter term predictions of UPF loads included in the predicted UPF loads of UPF1 and UPF2 than longer term predictions of UPF loads included in the predicted UPF loads of UPF1 and UPF2 when selecting the UPF on which to anchor the PDU session. Also, weighting selection of a UPF on which to anchor the PDU session may be made such as to favor selection of a UPF (e.g., UPF1 104 or UPF2 106) that has a current cellular telecommunication network serving area geographically covering the location of the new UE (i.e., may favor selection of the UPF associated with the data center that is closest geographically to the new UE).

Figure 2:
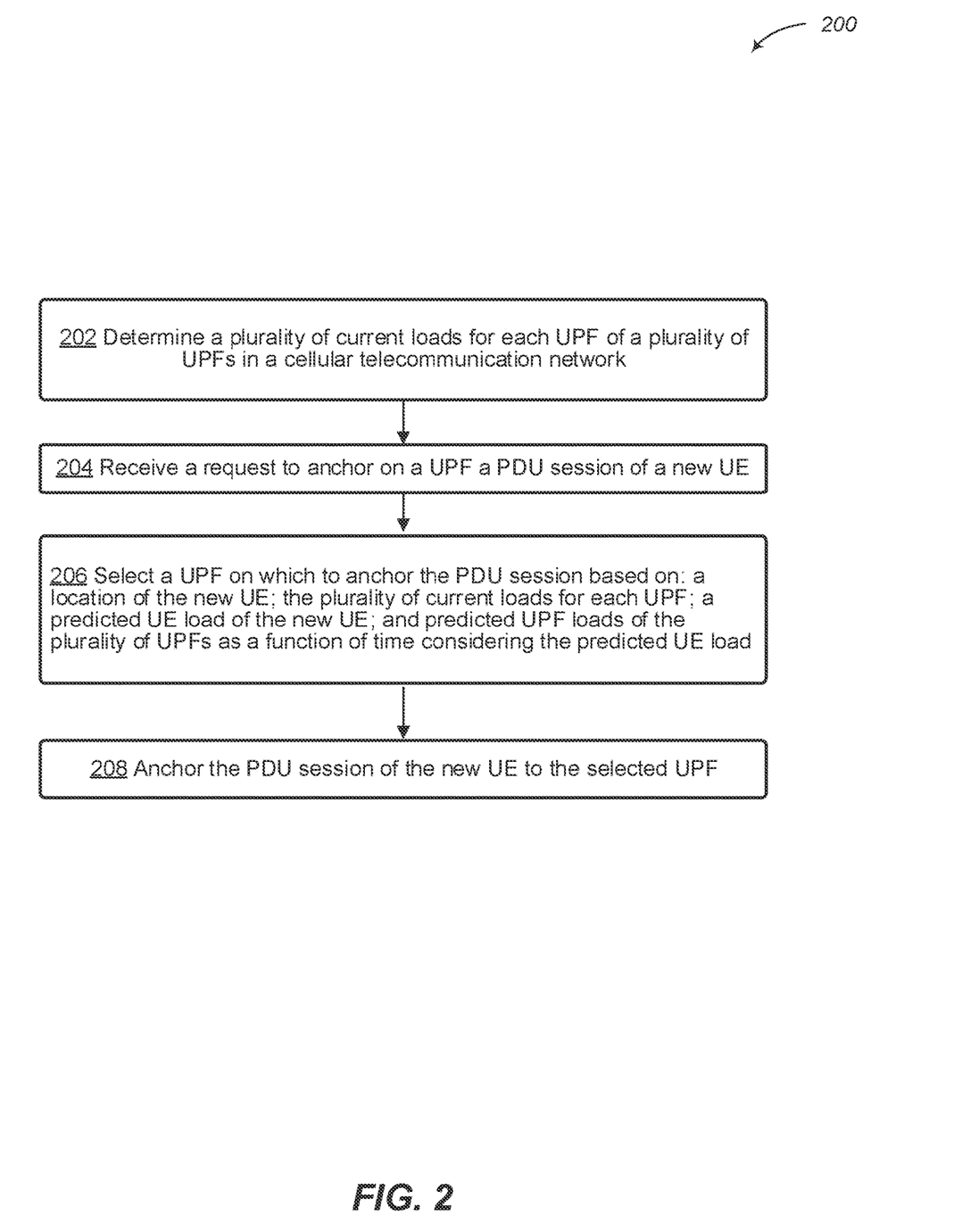
FIG. 2 illustrates a logical flow diagram showing one embodiment of a process for predictive UPF load balancing in accordance with embodiments described herein.

FIG. 2 illustrates a logical flow diagram showing one embodiment of a process 200 for predictive UPF load balancing in accordance with embodiments described herein.

At 202, the SMF determines a plurality of current loads for each UPF of a plurality of UPFs in a cellular telecommunication network. The plurality of UPFs serve as anchor points between UE in the cellular telecommunication network and DN. Each UPF of the plurality of UPFs is a virtual network function responsible for interconnecting PDU sessions between the user UE and the DN by anchoring the PDU sessions on individual UPFs.

At 204, the SMF 102 receives a request to anchor on a UPF a PDU session of a new UE newly appearing on the cellular telecommunication network.

At 206, the SMF 102 selects a UPF of the plurality of UPFs on which to anchor the PDU session based on: a location of the new UE; the plurality of current loads for each UPF of the plurality of UPFs; a predicted UE load of the new UE based on network data analytics; and predicted UPF loads of the plurality of UPFs as a function of time considering the predicted UE load based on network data analytics. For example, the SMF 102 may be configured to determine the plurality of current loads for each UPF of the plurality of UPFs; the predicted UE load of the new UE based on network data analytics; and the predicted UPF loads of the plurality of UPFs as a function of time considering the predicted UE load based on network data analytics captured or tracked by the NWDAF 116. In an example embodiment, the predicted UE load of the new UE based on network data analytics may be based on predicted throughput of the new UE.

At 208, the SMF 102 anchors the PDU session of the new UE to the selected UPF.

Figure 3:
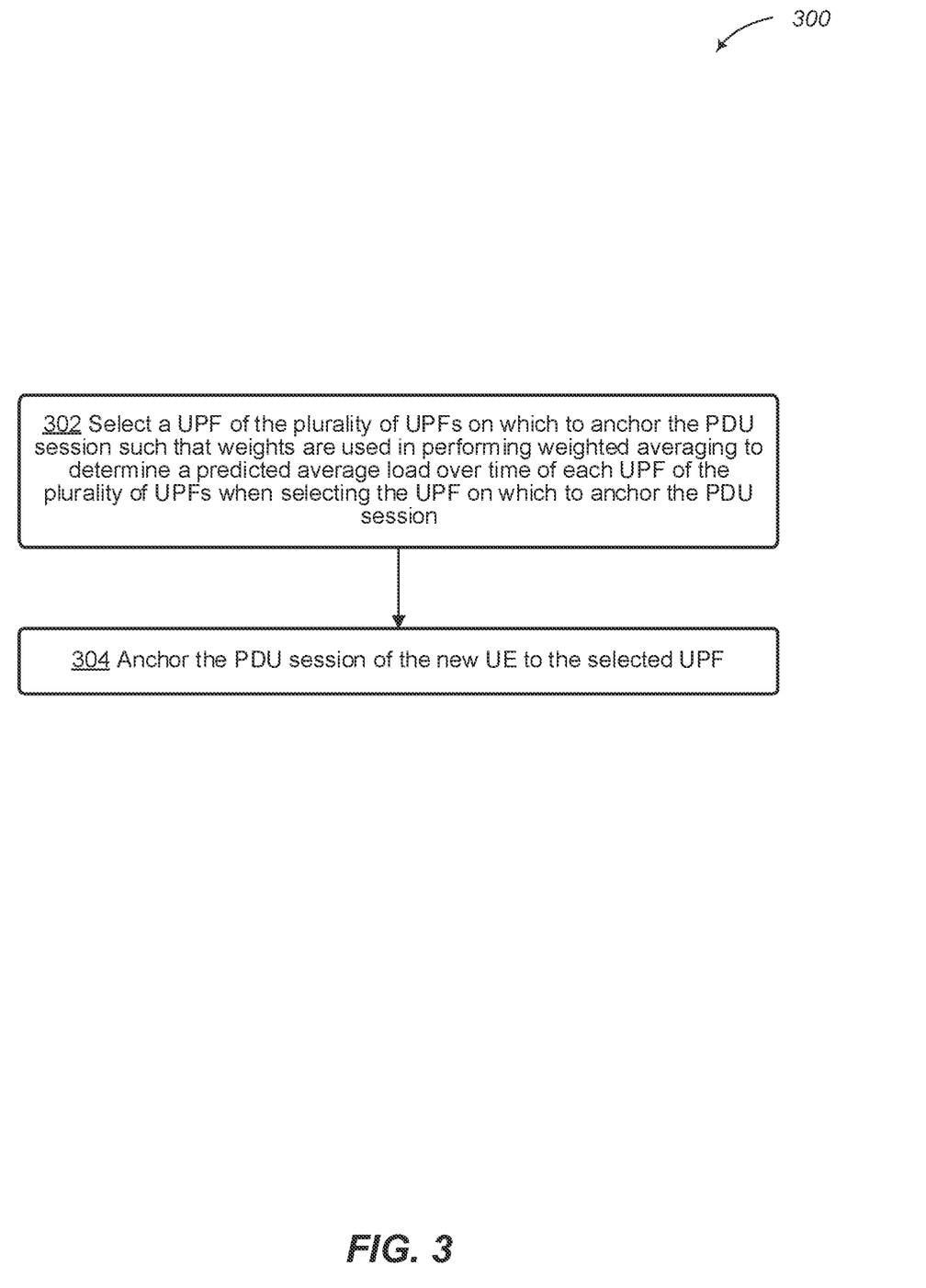
FIG. 3 illustrates a logical flow diagram showing one embodiment of a process for predictive UPF load balancing in which weights are used in performing weighted averaging to determine a predicted average load over time of each UPF of the plurality of UPFs when selecting the UPF on which to anchor the PDU session in accordance with embodiments described herein.

FIG. 3 illustrates a logical flow diagram showing one embodiment of a process 300 for predictive UPF load balancing in which weights are used in performing weighted averaging to determine a predicted average load over time of each UPF of the plurality of UPFs when selecting the UPF on which to anchor the PDU session. Any combination of weights for different predictions of UPF loads may be used. However, in the present example embodiment, larger weight is put on consideration of shorter term predictions of UPF loads than longer term predictions of UPF loads in accordance with embodiments described herein. For example, the process 300 may be used in the process 200 of FIG. 2 when selecting a UPF of the plurality of UPFs on which to anchor the PDU session.

At 302, the SMF 102 selects a UPF of the plurality of UPFs on which to anchor the PDU session such that weights are used in performing weighted averaging to determine a predicted average load over time of each UPF of the plurality of UPFs when selecting the UPF on which to anchor the PDU session. In one example embodiment, larger weight is put on consideration of shorter term predictions of UPF loads included in the predicted UPF loads than longer term predictions of UPF loads included in the predicted UPF loads when selecting the UPF on which to anchor the PDU session. For example, the NWDAF 116 may be configured to generate and provide such predictions and weights to the SMF 102.

At 304, the SMF 102 102 anchors the PDU session of the new UE to the selected UPF.

Figure 4:
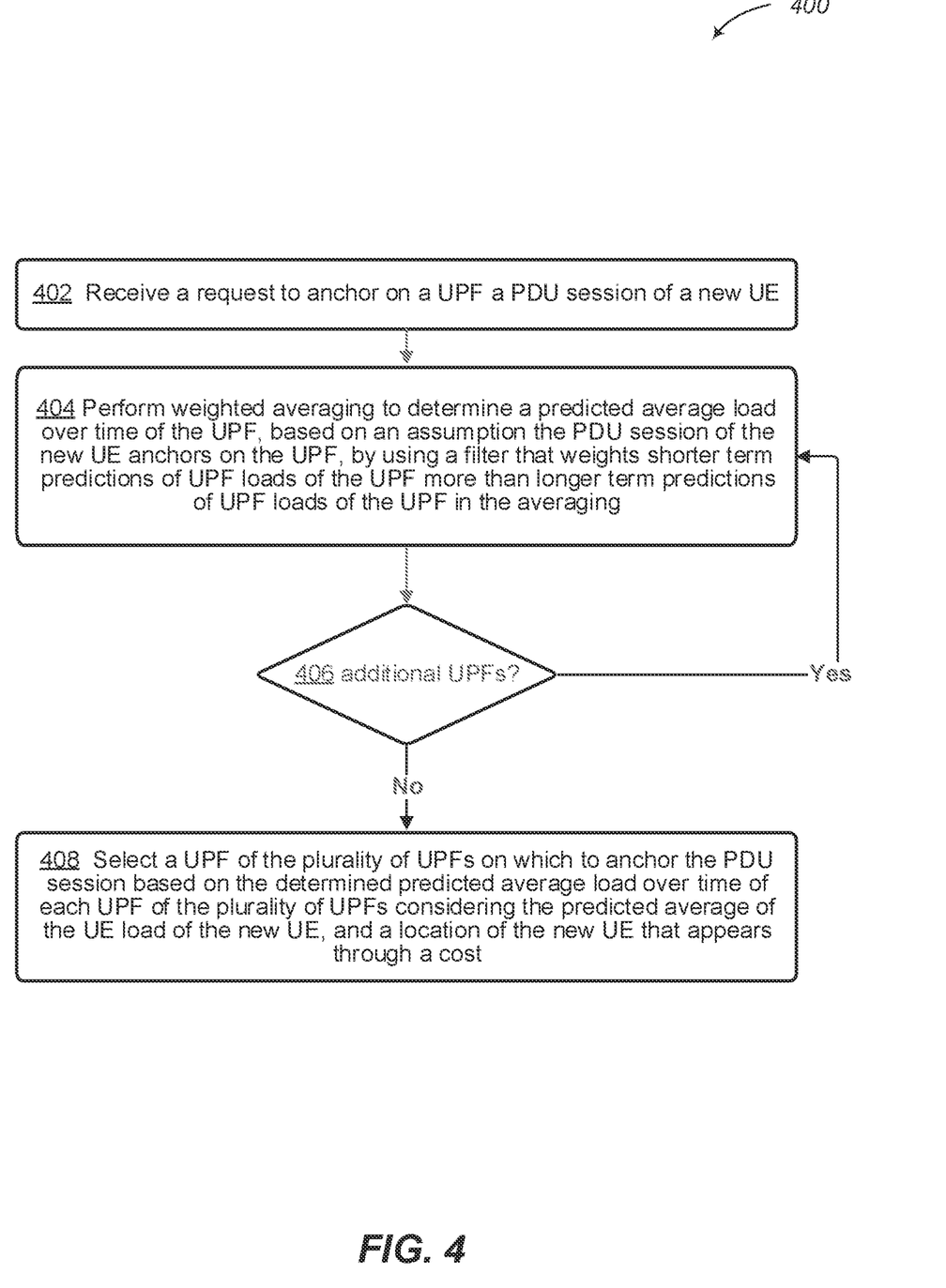
FIG. 4 illustrates a logical flow diagram showing one embodiment of a process for predictive UPF load balancing in weighted averaging is performed to determine a predicted average load over time of the UPFs in accordance with embodiments described herein.

FIG. 4 illustrates a logical flow diagram showing one embodiment of a process 400 for predictive UPF load balancing in weighted averaging is performed to determine a predicted average load over time of the UPFs in accordance with embodiments described herein. For example, the process 400 may be used in the process 300 of FIG. 3 when selecting a UPF of the plurality of UPFs on which to anchor the PDU session such that larger weight is put on consideration of shorter term predictions.

At 402, the SMF 102 receives a request to anchor on a UPF a PDU session of a new UE newly appearing on the cellular telecommunication network.

At 404, the SMF 102 or NWDAF 116 performs weighted averaging to determine a predicted average load over time of a UPF of the plurality of UPFs based on an assumption the PDU session of the new UE anchors on the UPF. This may be performed by using a filter (e.g., an exponential filter) that weights shorter term predictions of UPF loads of the UPF more than longer term predictions of UPF loads of the UPF in the averaging. The selection of a UPF of the plurality of UPFs on which to anchor the PDU session may also be weighted such as to favor selection of a UPF that has a current cellular telecommunication network serving area geographically covering the location of the new UE.

At 406, the SMF 102 determines whether there are additional UPFs in the plurality of UPFs on which the PDU session may be anchored. If it is determined there are additional UPFs on which the PDU session may be anchored, then the process 400 proceeds back to 404 performs weighted averaging to determine a predicted average load over time of the additional UPF of the plurality of UPFs based on an assumption the PDU session of the new UE instead anchors on the additional UPF. If it is determined there are not additional UPFs on which the PDU session may be anchored, then the process 400 proceeds to 408.

Figure 5:
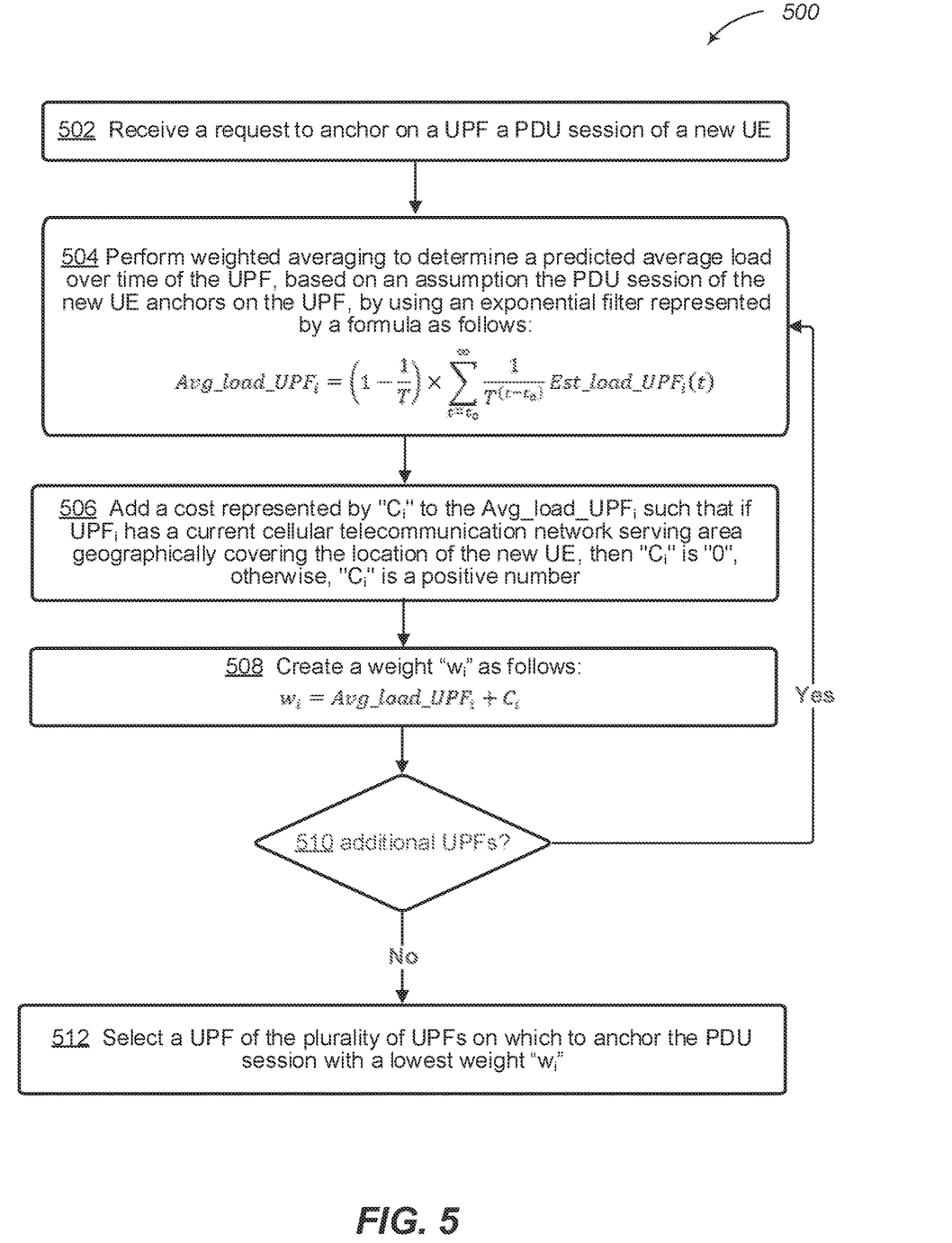
FIG. 5 illustrates a logical flow diagram showing one embodiment of a process for predictive UPF load balancing in weighted averaging to determine a predicted average load over time of the UPF is performed using an exponential filter in accordance with embodiments described herein.

At 408, the SMF 102 selects a UPF of the plurality of UPFs on which to anchor the PDU session based on the determined predicted average load over time of each UPF of the plurality of UPFs considering the predicted average of the UE load of the new UE, and a location of the new UE that appears through a cost FIG. 5 illustrates a logical flow diagram showing one embodiment of a process 500 for predictive UPF load balancing in weighted averaging to determine a predicted average load over time of the UPF is performed using an exponential filter in accordance with embodiments described herein. For example, the process 500 may be used in the process 400 of FIG. 4 in performing the weighted averaging to determine a predicted average load over time of the UPF.

At 502, the SMF 102 receives a request to anchor on a UPF a PDU session of a new UE newly appearing on the cellular telecommunication network.

At 504, the NWDAF 116 performs the weighted averaging of the future UPF load of a current UPF (denoted as $UPF_i$) of the plurality of UPFs to determine a predicted average load over time of the $UPF_i$ according to an exponential filter represented by a formula as follows. However, the exponential filter below is only one example embodiment of averaging filter realization. Other averaging filters may also be used in various other embodiments instead of an exponential filter.

$$\text{Avg\_load\_UPF}_i = \left(1 - \frac{1}{T}\right) \times \sum_{t=t_0}^{\infty} \frac{1}{T^{(t-t_0)}} \text{Est\_load\_UPF}_i(t)$$

The $\text{Avg\_load\_UPF}_i$ represents the determined predicted average load over time of an "i"th UPF in the plurality of UPFs, represented by $UPF_i$; i=1, ... N (in which N is a total number of UPFs in the plurality of UPFs); $\text{Est\_load\_UPF}_i(t)$ is an estimated load of $UPF_i$ at a future point in time "t" assuming the PDU session of the new UE anchors on $UPF_i$; and "T" represents a time constant.

In an example embodiment, the current UPF loads of each UPF in the plurality of UPFs at time "$t_0$" may be represented by $UPF_1: L_1(t_0)$, $UPF_2: L_2(t_0)$, ... $UPF_N: L_N(t_0)$. NWDAF 116 uses these loads and the UPF load statistics of each UPF to create the predicted UPF loads of each UPF in the plurality of UPFs. In particular, the predicted load of the UPF "i" at time "t" is calculated as $\text{load\_UPF}_i(t)$, for i=1, ..., N. NWDAF 116 has the predicted load of the attaching UE at time "t" as $\text{load\_UE}(t)$. In an example embodiment, the predicted UE load of the new UE may be based on predicted throughput of the new UE. NWDAF 116 uses predicted load of the UPF and the predicted load of the attaching UE to calculate the predicted load of UPF "i" if the UE attaches to this $UPF_i$ as $\text{Est\_load\_UPF}_i(t) = \text{load\_UPF}_i(t) + \text{load\_UE}(t)$, for i=1, ..., N.

The NWDAF 116 uses an averaging filter, such as an exponential filter with appropriate time-constant (memory) "T" (or any other appropriate filter with priority on shorter term predictions of UPF loads over longer term predictions of UPF loads) to predict the average load of UPF "i" if the new UE attaches to $UPF_i$. Thus, this gives higher priority to statistics for shorter term predictions of UPF loads compared to longer term predictions of UPF loads. For example, as noted above, the exponential filter may be represented by $\text{Avg\_load\_UPF}_i = \text{Exponential Average of}(\text{load\_UPE}_i(t) + \text{load\_UE}(t)) =$ -continued
$$\text{Avg\_load\_UPF}_i = \left(1 - \frac{1}{T}\right) \times \sum_{t=t_0}^{\infty} \frac{1}{T^{(t-t_0)}} \text{Est\_load\_UPF}_i(t).$$

At 506, the NWDAF 116 weights selection of a UPF of the plurality of UPFs on which to anchor the PDU session such as to favor selection of a UPF that has a current cellular telecommunication network serving area geographically covering the location of the new UE. For example, the NWDAF 116 may receive the values representing the predicted average UPF loads generated by using the exponential filter as described above at 504 and add a cost represented by "$C_i$" to the $\text{Avg\_load\_UPF}_i$ such that if $UPF_i$ has a current cellular telecommunication network serving area geographically covering the location of the new UE, then "$C_i$" is "0", otherwise, "$C_i$" is a positive number. This gives higher priority to keep the new UE on a UPF that has a current cellular telecommunication network serving area geographically covering the location of the new UE.

At 508, the NWDAF 116 creates a weight "$w_i$" for the current $UPF_i$ for as follows: $w_i = \text{Avg\_load\_UPF}_i + C_i$ (wherein i=1, ... N).

At 510, the SMF 102 determines whether there are additional UPFs in the plurality of UPFs on which the PDU session may be anchored. If it is determined there are additional UPFs on which the PDU session may be anchored, then the process 500 proceeds back to 504 to perform the weighted averaging to determine a predicted average load over time of the additional UPF of the plurality of UPFs based on an assumption the PDU session of the new UE instead anchors on the additional UPF. If it is determined there are not additional UPFs on which the PDU session may be anchored, then the process 500 proceeds to 512.

At 512, the SMF 102 selects a UPF of the plurality of UPFs on which to anchor the PDU session with a lowest weight "$w_i$". For example, the NWDAF 116 may electronically instruct the SMF 102 to select a UPF of the plurality of UPFs on which to anchor the PDU session with a lowest weight "$w_i$".

Figure 6:
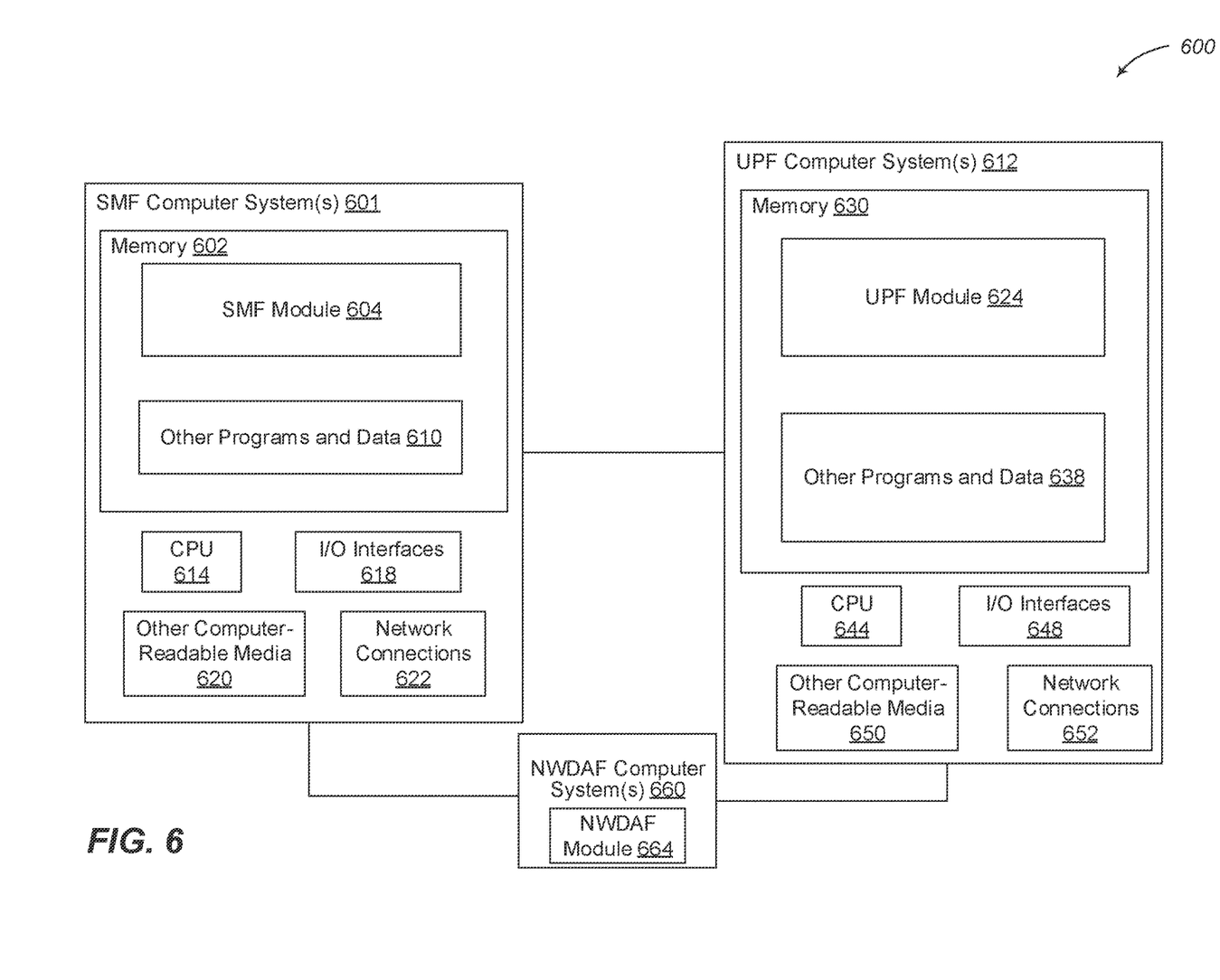
FIG. 6 shows a system diagram that describes various implementations of computing systems for implementing embodiments described herein.

FIG. 6 shows a system diagram that describes various implementations of computing systems for implementing embodiments described herein.

The SMF 102, the NWDAF 116 and the UPF, such as UPF1 104 and UPF2 106, can be implemented either as a network elements on dedicated hardware, as a software instance running on dedicated hardware, or as a virtualized function instantiated on an appropriate platform, e.g., a cloud infrastructure. In some embodiments, such NFs may be completely software-based and designed as cloud-native, meaning that they're agnostic to the underlying cloud infrastructure, allowing higher deployment agility and flexibility. However, FIG. 6 illustrates an example of underlying hardware on which the SMF 102, NWDAF 116 and the UPF, such as UPF1 104 and UPF2 106, may be implemented.

In particular, shown are example SMF computer system(s) 601, NWDAF computing system(s) 660 and UPF computer system(s) 612. For example, SMF 102 may be implemented using SMF computer system(s) 601. In some embodiments, one or more special-purpose computing systems may be used to implement SMF 102. Accordingly, various embodiments described herein may be implemented in software, hardware, firmware, or in some combination thereof. SMF computer system(s) 601 may include memory 602, one or more central processing units (CPUs) 614, I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon SMF module 604. The SMF module 604 is configured to implement and/or perform some or all of the functions of the SMF 102 described herein. Memory 602 may also store other programs and data 610, which may include load thresholds, predicted loads, databases, load-balancing rules, AI or ML programs to perform predictive analysis of UPF load based on predicted UE throughput, CPU utilization and/or memory utilization using data from the NWDAF, user interfaces, operating systems, other network management functions, other NFs, etc.

Network connections 622 are configured to communicate with other computing devices to facilitate the load balancing described herein. In various embodiments, the network connections 622 include transmitters and receivers (not illustrated) to send and receive data as described herein, such as sending data to and receiving data from UPFs, UEs and other NFs to send and receive instructions, commands and data to implement the processes described herein. I/O interfaces 618 may include a video interfaces, other data input or output interfaces, or the like. Other computer-readable media 620 may include other types of stationary or removable computer-readable media, such as removable flash drives, external hard drives, or the like.

In some embodiments, one or more special-purpose computing systems may be used to implement UPF, such as UPF1 104 and UPF2 106. Accordingly, various embodiments described herein may be implemented in software, hardware, firmware, or in some combination thereof. UPF computer system(s) 612 is an example of a computer system that may implement a UPF, such as UPF1 104 and UPF2 106. For example, computer system(s) 612 may be present in data center 1 to implement UPF1 104 or present in data center 2 to implement UPF2 106. Computer system(s) 612 may include memory 630, one or more central processing units (CPUs) 644, I/O interfaces 648, other computer-readable media 650, and network connections 652.

Memory 630 may include one or more various types of non-volatile and/or volatile storage technologies similar to memory 602. Memory 630 may be utilized to store information, including computer-readable instructions that are utilized by CPU 644 to perform actions, including embodiments described herein.

Memory 630 may have stored thereon UPF module 624. The UPF module 64 receives the messages or instructions from the SMF module 204 to perform the load balancing operations as described herein. Memory 630 may also store other programs and data 638, which may include load thresholds, databases, load-balancing rules, AI or ML programs to perform predictive analysis of UPF load based on predicted UE throughput, CPU utilization and/or memory utilization using data from the NWDAF, user interfaces, operating systems, other network management functions, other NFs, etc.

Network connections 652 are configured to communicate with other computing devices, such as SMF computer system(s) 601. In various embodiments, the network connections 652 include transmitters and receivers (not illustrated) to send and receive data as described herein. I/O interfaces 648 may include one or more other data input or output interfaces. Other computer-readable media 650 may include other types of stationary or removable computer-readable media, such as removable flash drives, external hard drives, or the like.

The NWDAF computing system(s) 660 includes NWDAF module 664, which is configured to implement and/or perform some or all of the functions of the NWDAF 116 described herein, including those of FIGS. 2-5. The NWDAF computing system(s) 660 may have the same or similar corresponding components as that shown in FIG. 6 for SMF computer system(s) 601 and/or UPF computer system(s) 612 (e.g., memory storing NWDAF module 664, CPU, I/O interfaces, other computer-readable media and network connections, etc.).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising, comprising:
    receiving, by a session management function, a request to anchor a protocol data unit session of a new user equipment;
    predicting, by the session management function over a series of times for each respective user plane function in a plurality of user plane functions that serve as anchor points between user equipment in a cellular telecommunication network and a data network, a respective load of the respective user plane function at each respective time in the series of times to generate a series of predicted loads;
    selecting, by the session management function, a user plane function from the plurality of user plane functions based on an analysis of factors that includes the series of predicted loads for each respective user plane function in the plurality of user plane functions; and
    anchoring, by the session management function, the protocol data unit session of the new user equipment on the selected user plane function;
    wherein:
    the method further comprises generating an average, for each respective user plane function in the plurality of user plane functions that serve as anchor points between user equipment in the cellular telecommunication network and the data network, of the series of predicted loads;
    the factors include the average of the series of predicted loads for each respective user plane function in the plurality of user plane functions; and
    generating the average of the series of predicted loads comprises generating a weighted average.

2. The method of claim 1, wherein the weighted average places more weight on a shorter term instance of the series of predicted loads than a longer term instance of the predicted loads.

3. The method of claim 2, wherein the weighted average places more weight on the shorter term instance of the series of predicted loads than the longer term instance of the predicted loads according to an averaging filter.

4. The method of claim 2, wherein the weighted average places more weight on the shorter term instance of the series of predicted loads than the longer term instance of the predicted loads according to an exponential filter.

5. The method of claim 1, wherein selecting the user plane function is weighted such as to favor selection of a user plane function that has a current cellular telecommunication network serving area geographically covering a location of the new user equipment.

6. The method of claim 1, wherein selecting, by the session management function, the user plane function from the plurality of user plane functions is based on the analysis of factors and the factors include a predicted user equipment load of the new user equipment based on network data analytics.

7. The method of claim 6, wherein the predicted user equipment load of the new user equipment is further based on a predicted throughput of the new user equipment.

8. The method of claim 6, wherein predicting, by the session management function over the series of times for each respective user plane function in the plurality of user plane functions that serve as anchor points between user equipment in the cellular telecommunication network and the data network, the respective load of the respective user plane function at each respective time in the series of times to generate a series of predicted loads is based at least in part on the predicted user equipment load of the new user equipment.

9. A non-transitory computer readable storage medium having computer executable intrusions stored thereon that, when executed by at least one processor, cause the at least one processor to perform operations including:
  receiving, by a session management function, a request to anchor a protocol data unit session of a new user equipment;
  predicting, by the session management function over a series of times for each respective user plane function in a plurality of user plane functions that serve as anchor points between user equipment in a cellular telecommunication network and a data network, a respective load of the respective user plane function at each respective time in the series of times to generate a series of predicted loads;
  selecting, by the session management function, a user plane function from the plurality of user plane functions based on an analysis of factors that includes the series of predicted loads for each respective user plane function in the plurality of user plane functions; and
  anchoring, by the session management function, the protocol data unit session of the new user equipment on the selected user plane function;
  wherein:
  the operations further comprise generating an average, for each respective user plane function in the plurality of user plane functions that serve as anchor points between user equipment in the cellular telecommunication network and the data network, of the series of predicted loads;
  the factors include the average of the series of predicted loads for each respective user plane function in the plurality of user plane functions; and
  generating the average of the series of predicted loads comprises generating a weighted average.

10. The non-transitory computer readable storage medium of claim 9, wherein the weighted average places more weight on a shorter term instance of the series of predicted loads than a longer term instance of the predicted loads.

11. The non-transitory computer readable storage medium of claim 10, wherein the weighted average places more weight on the shorter term instance of the series of predicted loads than the longer term instance of the predicted loads according to an averaging filter.

12. The non-transitory computer readable storage medium of claim 10, wherein the weighted average places more weight on the shorter term instance of the series of predicted loads than the longer term instance of the predicted loads according to an exponential filter.

13. The non-transitory computer readable storage medium of claim 9, wherein selecting the user plane function is weighted such as to favor selection of a user plane function that has a current cellular telecommunication network serving area geographically covering a location of the new user equipment.

14. The non-transitory computer readable storage medium of claim 9, wherein selecting, by the session management function, the user plane function from the plurality of user plane functions is based on the analysis of factors and the factors include a predicted user equipment load of the new user equipment based on network data analytics.

15. The non-transitory computer readable storage medium of claim 14, wherein the predicted user equipment load of the new user equipment is further based on a predicted throughput of the new user equipment.

16. A system comprising:
  a memory that stores computer instructions; and
  a processor that executes the computer instructions to perform operations including:
    receiving, by a session management function, a request to anchor a protocol data unit session of a new user equipment;
    predicting, by the session management function over a series of times for each respective user plane function in a plurality of user plane functions that serve as anchor points between user equipment in a cellular telecommunication network and a data network, a respective load of the respective user plane function at each respective time in the series of times to generate a series of predicted loads;
    selecting, by the session management function, a user plane function from the plurality of user plane functions based on an analysis of factors that includes the series of predicted loads for each respective user plane function in the plurality of user plane functions; and
    anchoring, by the session management function, the protocol data unit session of the new user equipment on the selected user plane function;
    wherein:
    the operations further comprise generating an average, for each respective user plane function in the plurality of user plane functions that serve as anchor points between user equipment in the cellular telecommunication network and the data network, of the series of predicted loads; and
    the factors include the average of the series of predicted loads for each respective user plane function in the plurality of user plane functions; and generating the average of the series of predicted loads comprises generating a weighted average.

* * * * *